G. PEREIRE AND G. JOLIVET.
RAILWAY CARRIAGE OF LARGE CAPACITY.
APPLICATION FILED MAR. 7, 1919.
1,392,523.
Patented Oct. 4, 1921.
5 SHEETS—SHEET 2.
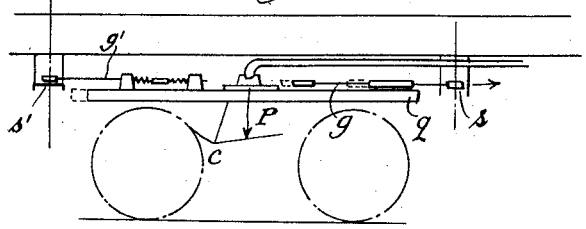
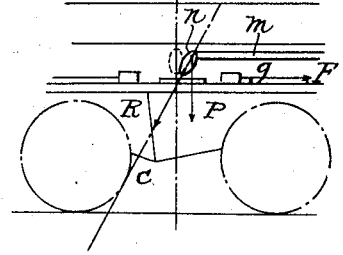
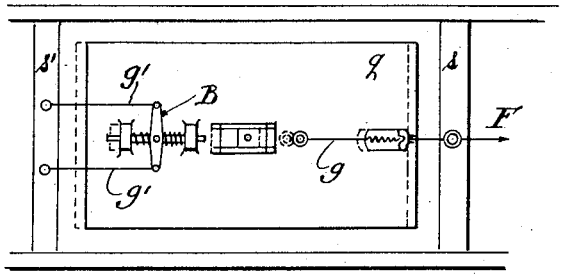
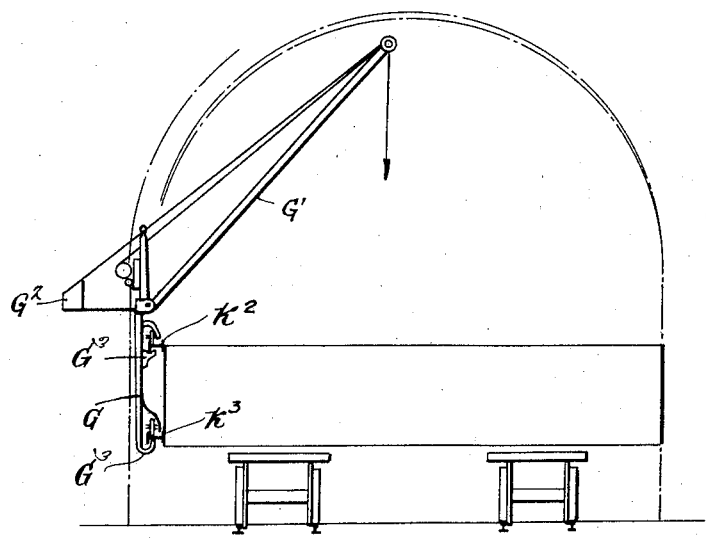

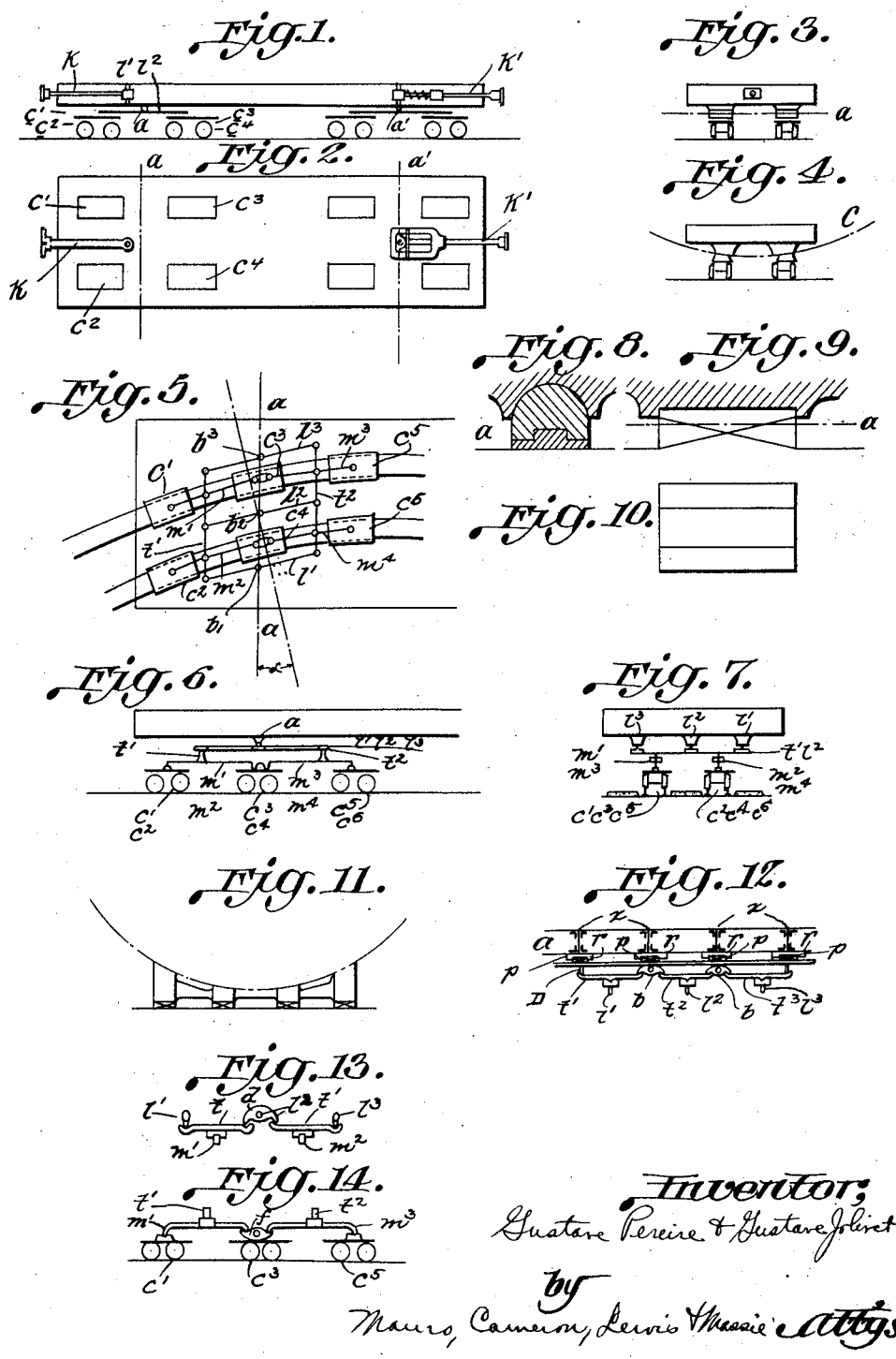

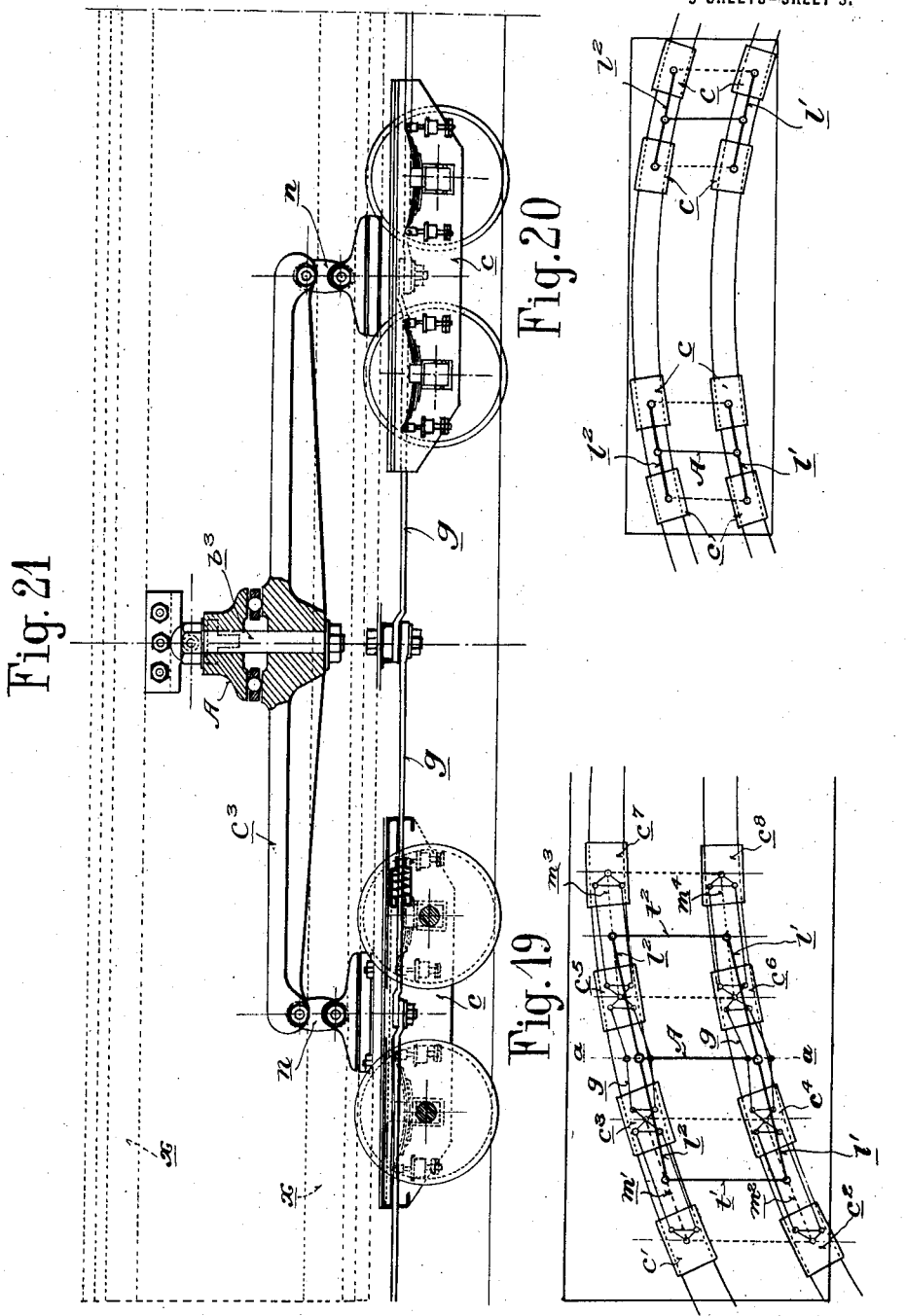

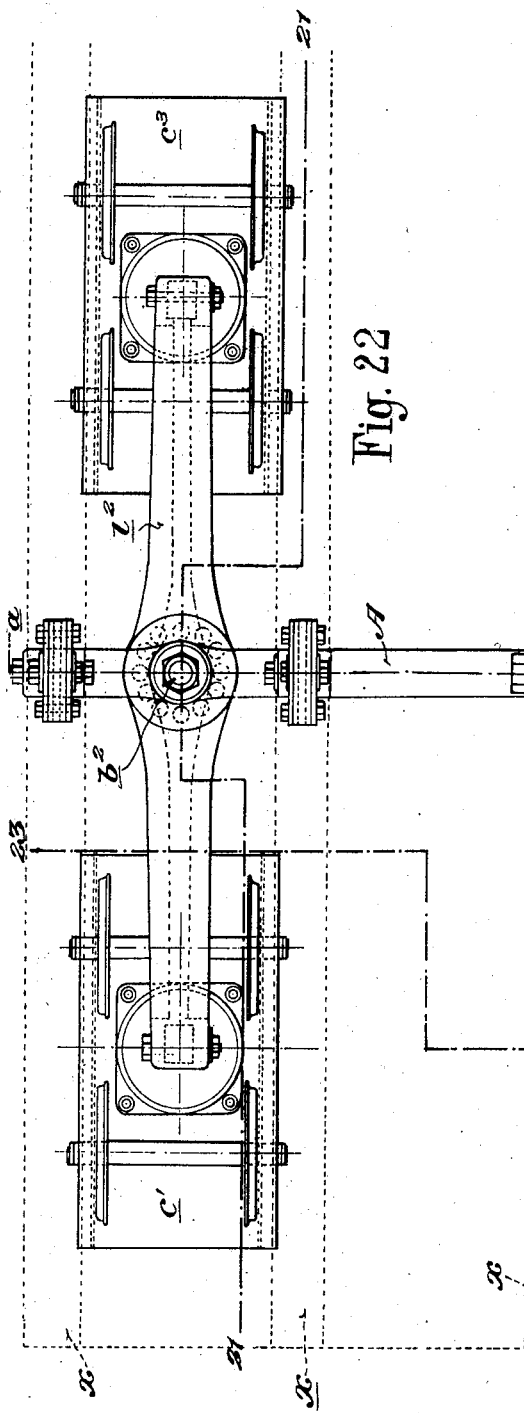

G. PEREIRE AND G. JOLIVET.
RAILWAY CARRIAGE OF LARGE CAPACITY.
APPLICATION FILED MAR. 7, 1919.

1,392,523. Patented Oct. 4, 1921.
5 SHEETS—SHEET 5.

UNITED STATES PATENT OFFICE.

GUSTAVE PEREIRE AND GUSTAVE JOLIVET, OF PARIS, FRANCE.

RAILWAY-CARRIAGE OF LARGE CAPACITY.

1,392,523.   Specification of Letters Patent.   Patented Oct. 4, 1921.

Application filed March 7, 1919. Serial No. 281,302.

*To all whom it may concern:*

Be it known that we, GUSTAVE PEREIRE and GUSTAVE JOLIVET, citizens of the Republic of France, and residents of 69 Rue de la Victoire, Paris, France, have invented new and useful Improvements in Railway-Carriages of Large Capacity, which improvements are fully set forth in the following specification:

This invention relates to improvements in traction mechanism for railway cars whereby cars of very large capacity can be mounted to travel on a plurality of parallel tracks. In carrying out the invention, the platform of the car is mounted at each end on a group of trucks arranged to travel in parallel succession on a plurality of tracks in parallel relation or approximately so, with each track comprising parallel lines of rails. A yielding mechanism is interposed between each group of trucks and the superposed end of the platform to permit lateral and longitudinal displacement of each group relative to the platform as the trucks follow the curves of their respective tracks, there being an individual displacement of each truck relative to the other members of the same group.

In the drawings, in which similar reference characters designate corresponding parts, Figures 1 to 18, inclusive, show diagrammatically the mechanism employed in carrying out the invention;

Figs. 1, 2 and 3, respectively show a side elevation, plan and end view of a platform mounted at each end upon a group of four trucks;

Fig. 4 shows an end view of a car in which the platform is mounted to turn on its longitudinal axis relatively to the supporting trucks;

Fig. 5 is a plan view showing the end of the platform mounted on two successions of three trucks each with the system of interposed levers, the trucks being shown traveling on a curve;

Fig. 6 is a side elevation of the same, the trucks being shown on a straight track;

Fig. 7 is an end view of the same;

Figs 8, 9 and 10 are detail views showing the bearing blocks interposed between the platform and the trucks to permit turning of the platform on its longitudinal axis;

Fig. 11 is an end elevation showing the bearing blocks in place;

Figs. 12, 13 and 14 show different systems of lever suspension between the platform and the trucks;

Fig. 15 is a side elevation of a truck, showing its yielding draw-bar connection with the platform;

Fig. 16 is a plan view of the same;

Fig. 17 is a side elevation of a truck, showing the link connection between the same and the end of the connecting lever;

Fig. 18 shows an end elevation of a car provided with a crane;

Fig. 19 is a plan view similar to Fig. 5, showing in addition the draw-bar connection between the trucks;

Fig. 20 is a plan view similar to Fig. 2, showing the two groups of trucks turning on a curve in the tracks;

Fig. 21 is a section on the broken line 21—21 of Fig. 22;

Fig. 22 is a plan view of an end of a car showing the end of the platform (in dotted lines), the axis beam fixed in the body of the platform, the levers pivoted to the axis beam to turn in horizontal planes, and the trucks pivoted to the ends of the levers;

Fig. 27 is a detail view showing one of the yielding link connections between the ends of two supporting levers, as shown in Fig. 14, and an intermediate truck;

Figs. 28 and 29 are diagrammatic views showing the limited longitudinal movement of the trucks relative to the platform during the progress and stopping of the car.

Figure 23:
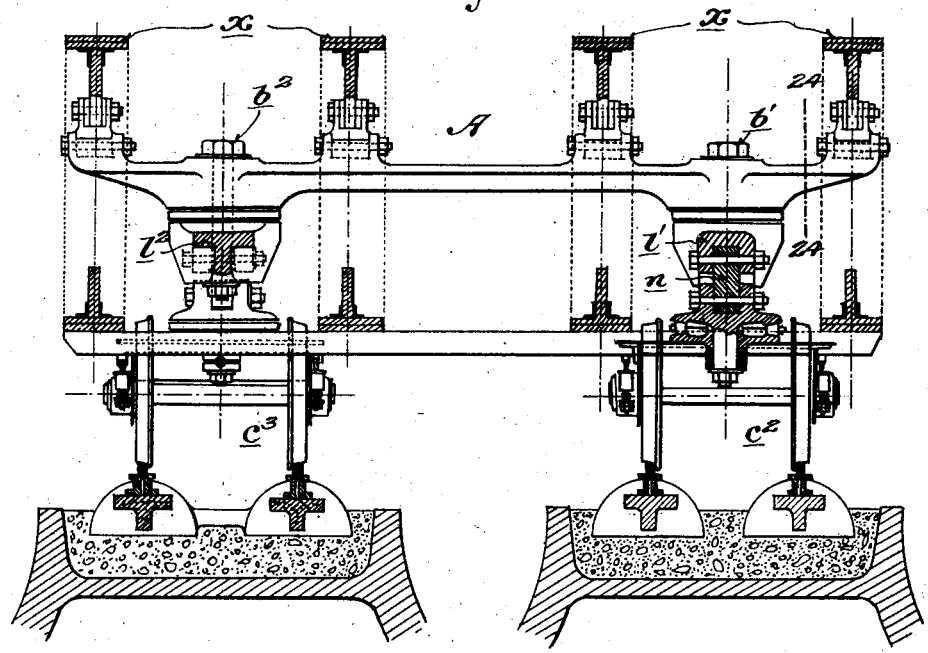
Fig. 23 is a section on the broken line 23—23 of Fig. 22.

Referring more particularly to Figs. 21 to 24, inclusive, which show a constructional embodiment of the invention, the platform of the car is formed primarily of four longitudinal beams $x$ suitably connected together in rigid parallel relation. Extending across each end of the platform, coincident with the transverse axis $a$ or $a'$ indicated diagrammatically in Fig. 2, is a cross-beam A firmly secured to the longitudinal beams $x$. To this cross-beam are pivoted the levers $l^1$, $l^2$, at $b^1$, $b^2$, respectively, to oscillate horizontally relatively to the platform. To each end of each lever is yieldingly connected one of the supporting bogie trucks $c^1$—$c^4$ by the link $n$.

The bogie trucks are divided into two groups, one at each end of the platform, to which the flooring transmits its weight at a series of points in a plane perpendicular to the plane of the lines cutting all the tracks at right angles and passing under ordinary conditions near to and preferably at the center of each group of bogie trucks. In the preferred form of construction, as shown in Figs. 1, 2, 21 and 22, there are four bogies in each group, but this number may be increased to meet the requirements of heavier loads, as shown in Figs. 5 and 19.

The warping which may result from the respective location of each of the groups of bogie trucks upon the tracks for example one at a curve with super elevation or change of inclination with respect to the neighboring vertical alinement, the other in vertical alinement and in horizontal plan will be compensated.

Either by the flexibility of the flooring the points of junction of the latter and of each of the groups will then be upon an axis of line $a$, $a$, Figs. 1, 2, 3, parallel with the plane of the tracks and situated in the normal plane of the pairs of rails before mentioned.

Or by rotation of the flooring upon one of the groups its point of junction with this latter group will then be situated on a circle C, Fig. 4, drawn in the plane already indicated, the inclination of the flooring with respect to the plane of support of the group of bogie corresponding trucks being then possible; the junction with the other group being made as before.

From each of these lines of axis or arcs of circle, the weight is distributed over each bogie truck by a set of levers forming a jointed parallelogram.

The system can be expanded to provide more than four bogie trucks in each group. For example in the case illustrated in Figs. 5, 6 and 7 the weight of the flooring is transmitted to the points $b^1$, $b^2$, $b^3$, placed upon the axis line $a$, to intermediate levers $l^1$, $l^2$, $l^3$, which transmit the load to transverse levers $t^1$, $t^2$ which finally through the levers $m^1$, $m^2$, $m^3$, $m^4$, carry back the weight upon the six bogie trucks $c^1$ to $c^6$. Fig. 19 shows a development of the system to include eight bogies in each group.

All the points of connection of the axis $a$ and of the levers $l^1$, $l^2$, $l^3$, of the several levers, as well as the levers $m^1$ to $m^4$, with the bogie trucks are formed of supporting surfaces suitable for receiving the corresponding loads, while permitting rotation around a vertical axis.

It will be seen that in such an arrangement while running on a curve, the bogie trucks guided by the rails and maintained at a distance by the levers will be steered slightly in the manner of the steering wheels of an automobile.

In order to allow this steering without having recourse to excessive play in the various joints the rails for the bogie trucks from axis to axis will be brought together in the curves an amount such that $e^1$ being their new distance and $\alpha$ the angle of the line of axis $a$ with the radius of the curve passing through the middle of this line of axis it is known that: $e^1 = e \cos \alpha$.

In order to facilitate the running at curves and to counter balance the action of centrifugal force upon the flooring this latter will transmit its load to the point situated upon the line of axis $a$ through the intermediary of inclined planes Figs. 8, 9, and 10 in the manner as carried out on certain locomotives.

Figure 25:
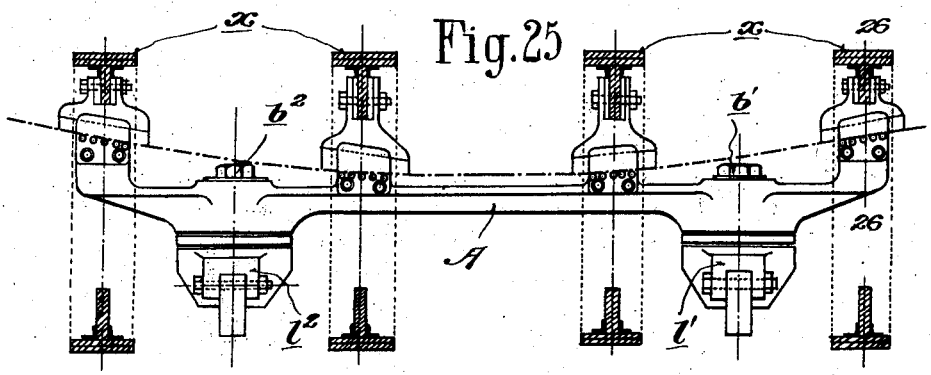
Fig. 25 is a vertical cross-section of the platform, showing the bearing blocks interposed between the platform and the pivotal mounting of the supporting levers, the bearing blocks permitting the turning of the platform on its longitudinal axis as the car travels on the curve in the tracks.
Figure 24:
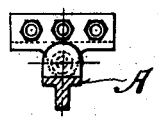
Fig. 24 is a section on the line 24—24 of Fig. 23.
Figure 26:
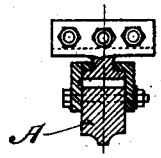
Fig. 26 is a section on the line 26—26 of Fig. 25.

When the support is on a circle the inclined planes will be situated between the circle of rotation of the flooring and the points of transmission of the loads upon the levers, Figs. 11, 25 and 26, or again a general superelevation will be given to the plane of all the tracks or better still the two methods will be combined.

Lastly in order to insure an equal distribution of the loads upon each bogie truck the use of auxiliary compensation levers may be employed.

For example in Fig. 12 the flooring of four beams can turn about the axis $a$ by means of suitable turning joints $r$, and slide upon the double inclined planes $p$, the lower portions of which are connected by a solid crosspiece D, which transmits the load to the longitudinal levers $l^1$, $l^2$, $l^3$, through the intermediary of the transverse levers $t^1$, $t^2$, $t^3$, which are provided with a joint at each of their ends and may be formed of powerful springs. The conditions of distribution of the load for example the equality of load upon the levers $l^1$, $l^2$, $l^3$ are carried out by the aid of small balanced levers $b$ oscillating about an axis fast with the cross piece D, the arms of these levers being equal or unequal according to the result desired.

Fig. 13 shows a second method of transverse balancing. The transverse lever $t$ of Fig. 5 is divided into two levers $t$ and $t^1$, which may be formed of springs and ends of which are provided with joints.

The distribution of the loads received by $l^1$, $l^2$, $l^3$, for example, equally upon $m^1$, $m^2$, is assured by the intermediary of $t$ and $t^1$, owing to the small balance lever $d$ whose axis of rotation is at the end of $l^2$. As desirable, the arms of this balance lever are equal or unequal.

Figs. 14 and 27 show a method of longitudinal balancing giving equality of load upon each of the bogie trucks on the same pair of rails.

The transverse levers $t^1$, $t^2$, transmit the load to the longitudinal levers $m^1$, $m^3$, under the conditions already stated supporting surface and vertical axis of rotation, the levers $m^1$, $m^3$ are provided with joints at each of their ends and may be formed of springs, the equal distribution of the loads upon the bogies is insured:

1. By the balance lever $f$ and having equal or unequal arms as desired and whose axis of oscillation is in one with the intermediate bogie truck $C^3$.

2. By the proper choice of the points of applying the loads derived from $t^1$, $t^2$, upon the levers $m^1$, $m^3$.

In order that the system of load distributing levers may on passing over curves possess all its suppleness a special arrangement of buffer bars and traction bars, or of traction bars and buffer bars with interposed springs may be employed to connect the bogie trucks with the flooring.

For example in Figs. 15, 16, 28 and 29 the bogie truck $c$ is connected with the flooring both by buffer bars and traction bars of the type $g$, or $g^1$ comprising springs the connection being formed at the small flooring of the bogie truck to transverse pieces $S$, $S^1$, firmly fixed to the main flooring.

By reason of the connection of the bogie trucks with the flooring by a system of levers forming a parallelogram the distance from the center of the bogie trucks to the point of attachment of the buffer and traction bar upon the cross piece S would be constant, if this bar were not provided with springs the point of attachment of this latter upon the cross piece S being placed in the vertical plane of the line of the points of attachment of the flooring upon the arrangement of load distributing levers.

The connecting bars may be either single with a joint at each end and an interposed spring as shown at $g$, Figs. 15 and 16 or formed of an arrangement of levers $g^1$, $g^1$, B, the traction and buffer springs receiving the action of the socket which carries the joint of the lever B. This latter method allows the bogie trucks to be attached upon the crosspiece S, moved from the line of the points of attachment of the flooring when the radius of the curves does not lead to a deformation of more than 2° to 3° in the angles of the load distributing parallelogram.

Generally it will be sufficient to attach the bogie trucks to each other, each row of bogie trucks being connected to the flooring at a point situated as above stated for the connection upon the cross piece S of Figs. 15 and 16.

The variations of length of the connecting bars due to compression or elongation of the springs may be relatively sufficiently small as not to require special correction arrangements in the system of load distributing levers—the play of these being sufficient. It is preferable however to provide a compensating arrangement.

For example in Figs. 15 and 16 the arrangement which receives the load P at the plumb line of the center of oscillation of the bogie truck so as to insure proper distribution of the loads upon each bogie axle can slide an amount equal to the variation of length of the attachment bars.

This arrangement has the disadvantage of displacing the load P in such a manner that its movement with respect to the center of oscillation is in the same direction as that of the pull F. It can therefore only be adopted when the method of construction of the bogie trucks is such that the relieving of one of the axles which may result from the simultaneous action of the forces P and F will not be dangerous.

The arrangement shown in Fig. 17 (which allows the displacement of the point of application of the lever or load distributing lever $m$, due to the small oscillating lever $n$), gives rise to an oblique force R, of which the moment with respect to the center of oscillation is in a direction opposite to that of the pull F.

In order to insure the perfect stability, the flexibility of the buffer and traction springs may be calculated in such a manner that the movements of R and F with respect to the center of oscillation of the suspended portion of the bogie truck becomes annulled.

The barge trucks may be coupled together in the manner of ordinary trucks preferably with a single central coupling acting as buffer and draw-bar.

This attachment may be without a spring as shown at K, Figs. 1 and 2, but is preferably provided with a spring such as $K^1$.

The point at which the couplings are attached to the flooring is as near as possible to the vertical axis about which each of the groups of bogie trucks turns on the flooring as with the coupling K of Figs. 1 and 2 or at this axis as with the couplings $K^1$.

Fig. 18 shows a special type of running crane applicable more particularly to these carriages but which is equally suitable for canal barges and ships.

This crane runs upon two superposed rails $K^2$ and $K^3$ not necessarily in the same vertical plane but firmly connected with the outer walls of the carriage.

The crane carriage G, on the upper end of which is pivoted, in the usual manner, the arm G¹ and its counterwieight G², is provided with pairs of clips G³ that engage the rails K², K³ to maintain the carriage in an upright position on the car. On the upper member of each pair of clips is a roller to bear on the adjacent rail so that the position of the crane can be easily shifted. In the operation of the crane, any tendency to tilt is opposed by the weight of the car and its load.

The barge carriages forming the subject of the present invention allow the transport on railways of considerable loads and especially those which hitherto could be only undertaken economically by water.

The application of the herein described system gives economical results greater than those obtained on existing railways.

The system is not incompatible with great and even very great speeds for the comfortable transport of passengers.

The employment of barge carriages with their unloading apparatus bringing heavy loads to the quay side and occupying only short lengths of rail will allow unloading operations to be accelerated while requiring a length of quay much less than in existing tracks.

Claims:

1. In a railway carriage, the combination of a platform mounted at each end upon a group of separate trucks adapted to travel on a plurality of approximately parallel tracks with each track comprising parallel lines of rails, the trucks of each group being arranged to travel in parallel succession on said tracks, and yielding means connecting each group of trucks with the superposed end of the platform to transmit the load from the platform to the trucks and to permit lateral and longitudinal displacement of each group of trucks relative to the platform as the trucks follow the curves in their respective tracks.

2. In a railway carriage, the combination of a platform mounted at each end upon a group of separate trucks adapted to travel on a plurality of approximately parallel tracks with each track comprising parallel lines of rails, the trucks of each group being arranged to travel in parallel succession on said tracks, and yielding means connecting each truck of each group with the superposed end of the platform to transmit the load from the platform to the trucks and also operating to permit lateral and longitudinal displacement of each of the trucks relative to the platform as the trucks follow the curves in their respective tracks.

3. In a railway carriage, the combination of a platform mounted at each end upon a group of separate trucks adapted to travel on a plurality of approximately parallel tracks with each track comprising parallel lines of rails, the trucks of each group being arranged in parallel succession on said tracks, a plurality of levers interposed between each group of trucks and the platform to transmit the load from the platform to the trucks, each of said levers normally extending longitudinally of the platform and pivoted between its ends to the same to oscillate horizontally and having pivotal connections at its ends with trucks in the same succession, said levers forming a yielding connection between the platform and the trucks to permit lateral and longitudinal displacement of each group of trucks relative to the platform as the trucks follow the curves of their respective tracks.

4. In a railway carriage, the combination of a platform mounted at each end upon a group of separate trucks adapted to travel on a plurality of approximately parallel tracks with each track comprising parallel lines of rails, the trucks of each group being arranged in parallel succession on said tracks, and yielding means interposed between each group of trucks and superposed end of the platform to transmit the load from the platform to the trucks, said yielding means comprising a plurality of levers pivoted to each end of the platform in the same transverse plane extending across the platform to oscillate horizontally thereon, each of said levers having its ends yieldingly connected to trucks in the same succession, said levers forming a yielding connection between the platform and the trucks to permit lateral and longitudinal displacement of each group of trucks relative to the platform as the trucks follow the curves of their respective tracks.

5. In a railway carriage, the combination of a platform mounted at each end upon a group of separate trucks adapted to travel on a plurality of approximately parallel tracks with each track comprising parallel lines of rails, the trucks of each group being arranged to travel in parallel succession on said tracks, and yielding means interposed between each group of trucks and superposed end of the platform to transmit the load from the platform to the trucks, said yielding means comprising a plurality of horizontally oscillative levers pivoted to the platform and connected at their ends to form an articulated parallelogram, said levers being yieldingly connected at the ends of the parallelogram to the end members of the adjacent group of trucks and operating to permit lateral and longitudinal displacement of the connected group of trucks relative to the platform as the trucks follow the curves of their respective tracks.

6. In a railway carriage, the combination of a platform mounted at each end upon a group of separate trucks adapted to travel on a plurality of approximately parallel tracks with each track comprising parallel lines of rails, the trucks of each group being arranged to travel in parallel succession on said tracks, and yielding means interposed between each group of trucks and superposed end of the platform to transmit the load from the platform to the trucks, said yielding means comprising a plurality of horizontally oscillative levers pivoted to each end of the platform in the same transverse plane extending across the platform, cross-pieces connecting the ends of the levers to form therewith an articulated parallelogram, and secondary levers pivoted to the cross-pieces to oscillate horizontally thereon and each of the secondary levers having yielding connections at its ends with trucks in the same succession, said yielding means so formed operating to permit lateral and longitudinal displacement of each group of trucks relative to the platform as the trucks follow the curves of their respective tracks.

7. In a railway carriage, the combination of a platform mounted at each end upon a group of separate trucks adapted to travel on a plurality of approximately parallel tracks with each track comprising parallel lines of rails, the trucks of each group being arranged to travel in parallel succession on said tracks, each truck having a limited yielding connection with the platform to have limited longitudinal displacement relative to the same, and a plurality of horizontally oscillative levers pivoted to each end of the platform and connected at their ends to the members of the adjacent group of trucks, each lever being connected at both ends to trucks in the same succession, said levers operating to transmit the load from the platform to the trucks and permitting lateral displacement of the trucks relative to the platform as the trucks follow the curves of their respective tracks.

8. In a railway carriage, the combination of a platform mounted at each end upon a group of separate trucks adapted to travel on a plurality of approximately parallel tracks with each track comprising parallel lines of rails, the trucks of each group being arranged to travel in parallel succession on said tracks, a plurality of horizontally oscillative levers pivoted to each end of the platform in the same transverse plane extending across the platform, each lever normally extending longitudinally of the platform, and links connecting the ends of each lever with trucks in the same succession, said levers and their link connections with the trucks permitting lateral and longitudinal displacement of each group of trucks relative to the platform as the trucks follow the curves of their respective tracks.

In testimony whereof we have signed this specification.

GUSTAVE PEREIRE.
GUSTAVE JOLIVET.